(12) United States Patent
Liang et al.

(10) Patent No.: US 8,064,457 B2
(45) Date of Patent: Nov. 22, 2011

(54) SYSTEM AND METHOD FOR FILTERING A DATA PACKET USING A COMMON FILTER

(75) Inventors: Victor Liang, Irvine, CA (US); Shiang-feng Lee, Irvine, CA (US); David Ho Suk Chung, Rancho Palos Verdes, CA (US)

(73) Assignee: Samsung Electronics Co., Ltd., Suwon (KR)

(*) Notice: Subject to any disclaimer, the term of this patent is extended or adjusted under 35 U.S.C. 154(b) by 173 days.

(21) Appl. No.: 12/428,375

(22) Filed: Apr. 22, 2009

(65) Prior Publication Data

US 2010/0272120 A1    Oct. 28, 2010

(51) Int. Cl.
H04L 12/28    (2006.01)
H04L 12/56    (2006.01)

(52) U.S. Cl. ........ 370/392; 375/143; 375/152; 380/205; 380/207; 380/208

(58) Field of Classification Search ............ 370/392; 375/143, 152; 380/208; 381/71.11; 455/213
See application file for complete search history.

(56) References Cited

U.S. PATENT DOCUMENTS

| | | | | |
|---|---|---|---|---|
| 5,951,651 | A * | 9/1999 | Lakshman et al. | 709/239 |
| 7,369,554 | B1 * | 5/2008 | Modelski et al. | 370/392 |
| 7,684,400 | B2 * | 3/2010 | Govindarajan et al. | 370/392 |
| 7,724,740 | B1 * | 5/2010 | Wang et al. | 370/392 |
| 7,817,662 | B2 * | 10/2010 | McDaniel et al. | 370/463 |
| 2002/0106018 | A1 | 8/2002 | D'Luna et al. | |
| 2003/0169736 | A1 | 9/2003 | Lavigne et al. | |
| 2004/0028046 | A1 | 2/2004 | Govindarajan et al. | |
| 2005/0135351 | A1 | 6/2005 | Parmar et al. | |
| 2006/0143655 | A1 | 6/2006 | Ellis et al. | |
| 2008/0232359 | A1 * | 9/2008 | Kim et al. | 370/389 |
| 2009/0109973 | A1 * | 4/2009 | Ilnicki | 370/392 |
| 2009/0204677 | A1 | 8/2009 | Michaelis et al. | |
| 2010/0020799 | A1 | 1/2010 | Lee et al. | |

OTHER PUBLICATIONS

Office Action mailed Dec. 23, 2009 in U.S. Appl. No. 12/180,451.
Notice of Allowance mailed May 27, 2010 in U.S. Appl. No. 12/180,451.
Jelassi et al., "A Two-Level Packet Classification", INT, National Institute of Telecommunication, Evry, France, pp. 1-4, Jul. 6, 2006.
Erman et al., "Traffic Classification Using Clustering Algorithms", University of Calgary, Calgary, AB, Canada, pp. 1-6, Jan. 20, 2005.

(Continued)

*Primary Examiner* — Ayaz Sheikh
*Assistant Examiner* — Blanche Wong
(74) *Attorney, Agent, or Firm* — Beyer Law Group LLP

(57) ABSTRACT

System and method for filtering a data packet using a combined filter are disclosed. In one aspect, the method includes receiving a data packet and N filters each comprising a mask and value. The method includes receiving a data packet and N (wherein N is an integer and N>1) filters, each filter comprising a bit mask and corresponding bit values. The method further includes generating a common filter mask and the corresponding bit values by taking the overlapping mask bits among portions of the N filters corresponding to the common filter, the common filter being of a length smaller than each filter. The method further includes applying the common filter mask to the data packet to determine whether there is a match between the filtered data packet and each of the N filters.

17 Claims, 6 Drawing Sheets

OTHER PUBLICATIONS

"HSM; A Fast Packet Classification Algorithm", Bo Xu, Research Institute of Information Technology (RIIT), Tsinghua University, Dongyi Jiang, Juniper Networks, Inc., Jun Li, Research Institute of Information Technology (RIIT), Tsinghua University, Beijing, China, pp. 1-8, 19$^{th}$ International Conference on (1550-445X) Mar. 20-30, 2005, vol. 1.

Zander et al., "Self-Learning IP Traffic Classification Based on Statistical Flow Characteristics", Centre for Advanced Internet Architectures, Swinburne University of Technology, Melbourne, Australia, pp. 1-4, Sep. 11-5, 2006.

Final Office Action mailed May 26, 2011 in U.S. Appl. No. 12/428,359.

Office Action mailed Dec. 8, 2010 in U.S. Appl. No. 12/428,359.

Notice of Allowance dated Sep. 9, 2011 from U.S. Appl. No. 12/428,359.

* cited by examiner

SYSTEM AND METHOD FOR FILTERING A DATA PACKET USING A COMMON FILTER

CROSS-REFERENCE TO RELATED APPLICATIONS

This application is related to U.S. application Ser. No. 12/428,359, filed on the same day herewith and titled "SYSTEM AND METHOD FOR FILTERING A DATA PACKET USING A COMBINED FILTER," and U.S. application Ser. No. 12/180,451, filed on Jul. 25, 2008 and titled "METHOD AND SYSTEM FOR DATA FILTERING FOR DATA PACKETS." Each of the above applications is hereby incorporated by reference in its entirety.

BACKGROUND OF THE INVENTION

1. Field of the Invention

The invention relates to a data filtering scheme with multiple filters.

2. Description of the Related Technology

In a cable television system, a cable headend often sends a large amount of network traffic to a set top box (STB). The set top box needs to examine each data packet and find the data patterns matching the data packet for further processing. Different data patterns are provided by the headend with multiple filters, and these patterns can be changed or adjusted by the headend. This makes it difficult to apply existing data filtering algorithms which use fixed data pattern for filtering, such as the data filtering algorithms used in IP packet filtering or IP firewall protection.

Filters in a cable STB exist in the form of a (n×m) matrix, where n and m is the number of rows and columns, respectively. Let $f_{ij}$ represents a filter located in i-th row and j-th column in the matrix. All the conditions of each filter in the i-th row (i.e. $f_{i0}$, $f_{i1}$, $f_{im}$) must be satisfied when evaluating the filters in the row. In other words, the evaluation of filters in the row uses AND operator. However, OR operator is used for the evaluation of filters in j-th columns (i.e. $f_{0j}$, $f_{ij}$, ..., $f_{mj}$)). Traditional data filtering is done "sequentially", that is, full filtering starts with at the 0-th row (i.e. $f_{00}$, $f_{01}$, ..., $f_{0m}$). If 0-th row is not satisfied, then it moves on to the next row until one finds the correct set of filters in a specific row. Typically, a packet is sequentially compared to each filter until a match, or dropped after comparing to the last filter.

The data filtering requires a large amount of processing time and resources. Given that the traditional data filtering scheme is computationally complex, it is desirable to find an improved scheme with reduced computational complexity.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

One aspect relates to a method of filtering a data packet. The method comprises receiving a data packet and N (wherein N is an integer and N>1) filters, each filter comprising a bit mask and corresponding bit values. The method further comprises generating a common filter mask and the corresponding bit values by taking the overlapping mask bits among portions of the N filters corresponding to the common filter, the common filter being of a length smaller than each filter. The method further comprises applying the common filter mask to the data packet to determine whether there is a match between the filtered data packet and each of the N filters.

Another aspect relates to a computer-readable medium having stored therein a program which, when executed, performs a method of filtering a data packet. The method comprises receiving a data packet and N (wherein N is an integer and N>1) filters, each filter comprising a bit mask and corresponding bit values. The method further comprises generating a common filter mask and the corresponding bit values by taking the overlapping mask bits among portions of the N filters corresponding to the common filter, the common filter being of a length smaller than each filter. The method further comprises applying the common filter mask to the data packet to determine whether there is a match between the filtered data packet and each of the N filters.

Another aspect relates to a system for filtering a data packet. The system comprises a storage module configured to store a data packet and N filters, each filter comprising a bit mask and corresponding bit values. The system further comprises a common filter generation module configured to generate a common filter mask and the corresponding bit values by taking the overlapping mask bits among portions of the N filters corresponding to the common filter, the common filter being of a length smaller than each filter. The system further comprises a pre-filtering module configured to apply the common filter mask to the data packet to determine whether there is a match between the filtered data packet and each of the N filters.

Another aspect relates to a system for filtering a data packet. The system comprises means for receiving a data packet and N (wherein N is an integer and N>1) filters, each filter comprising a bit mask and corresponding bit values. The system further comprises means for generating a common filter mask and the corresponding bit values by taking the overlapping mask bits among portions of the N filters corresponding to the common filter, the common filter being of a length smaller than each filter. The system further comprises means for applying the common filter mask to the data packet to determine whether there is a match between the filtered data packet and each of the N filters.

BRIEF DESCRIPTION OF THE DRAWINGS

FIGS. 4-5 are diagrams illustrating an example in which the method of FIG. 3 is applied for data filtering.

DETAILED DESCRIPTION OF CERTAIN INVENTIVE EMBODIMENTS

Figure 1:
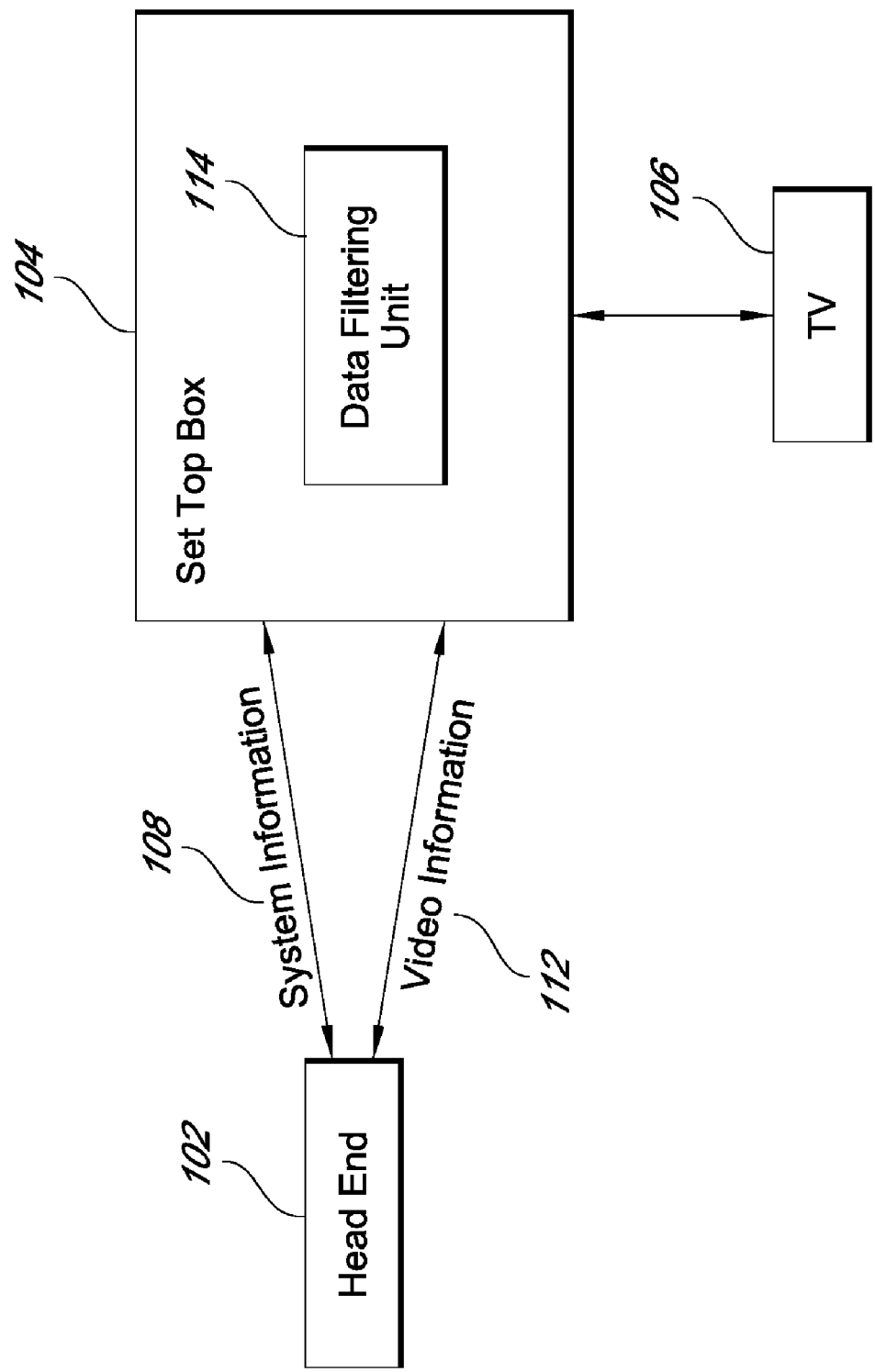
FIG. 1 is a diagram illustrating an exemplary cable television system.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Certain embodiments relate to a method and system for filtering a data packet with a group of filters to find a matched filter. In one embodiment, a common filter mask is created based on the group of filters to filter out unqualified candidates prior to performing a full filtering, thereby reducing computational complexity of the filtering scheme. Though the method is illustrated in an exemplary context of a set top box, the method is equally applicable to data filtering for other applications.

FIG. 1 is a diagram illustrating an exemplary cable television system. The cable service provider 102 (e.g., a cable head end) sends video information 112 and system information 108 to a set top box (STB) 104. The set top box 104 processes the received information and provides video signals to the television 106 for rendering. In one embodiment, the STB 104 may be embedded into the television 106.

The system information 108 may include a large amount of data packets conveying audio/programming information. The system information 108 may be provided from the cable head end 102 via a DOCSIS Ste-top Gateway (DSG) tunnel (not shown). A data filtering unit 114 inside the set top box 104 processes each data packet to find the data patterns matching the data packet for further processing. The data filtering unit 114 may be located in a decoder module within the STB 104. Different data patterns are provided by the headend 102 with multiple filters, and these patterns may be changed or adjusted by the headend 102. This makes it difficult to apply existing data filtering algorithms which use fixed data pattern for filtering.

Figure 2A:
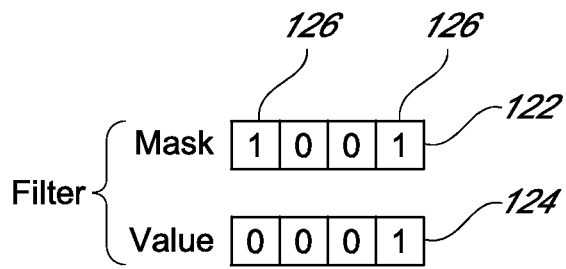
FIGS. 2A-2C are diagrams illustrating an exemplary flow of filtering a packet.
Figure 2B:
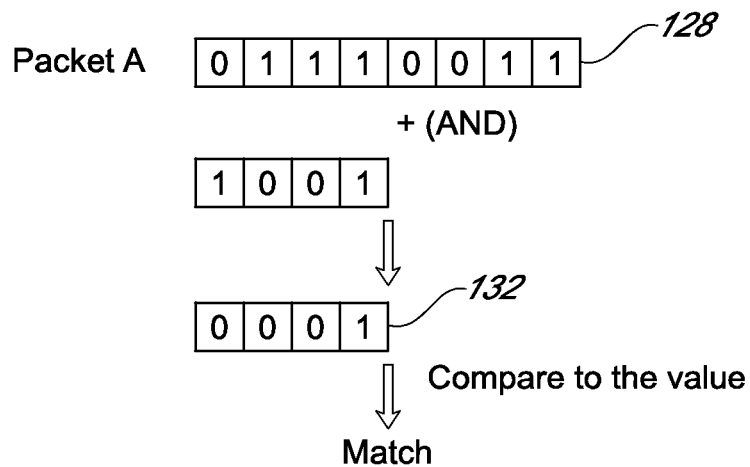

FIGS. 2A and 2B are diagrams illustrating an exemplary flow of filtering a packet. As shown in FIG. 2A, a filter comprises a mask 122 typically having one or more bits 126. Each bit may have the value of either 0 or 1. There is also a value 124 having the same number of bits as the mask 122. There is one bit in the value corresponding to each bit of the mask 122.

Figure 2C:
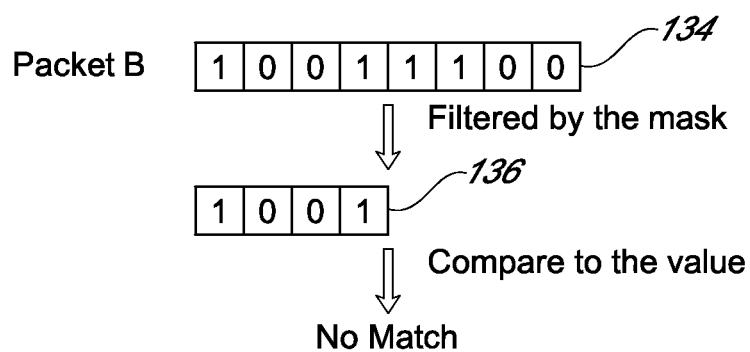

FIG. 2B illustrates how to determine whether there is a match between a data packet and a filter. The packet A 128 is first filtered by the mask 122 by performing an AND operation between each bit of the mask 122 and the corresponding bit in the packet 128. Since the exemplary mask 122 starts from the leftmost bit in a packet, the first bit of the mask 122 is aligned with the first bit of the packet. The resulting packet 132 is then compared to the value 124. If every bit of the filtered packet 132 has the same value as the corresponding bit in the value 124, it is concluded that there is a match between the packet and the filter. In this example, a match is found between the packet 128 and the filter. In another example shown in FIG. 2C, since the first bit of the filtered packet 136 has a different value from the corresponding bit in the value 124, it is concluded that there is no match between the packet 134 and the filter.

In this example, the filter starts from the leftmost bit in a packet. However, the filter can be configured to start from any location in a packet. In another example, the filter is set to start from the $9^{th}$ bit in a packet. In that case, when the data packet is filtered by the filter mask, the first bit of the filter mask is first aligned with the $9^{th}$ bit in the packet. The AND operation is then performed between a bit of the filter mask and a corresponding bit in the packet aligning with the bit of the filter mask.

Figure 3:
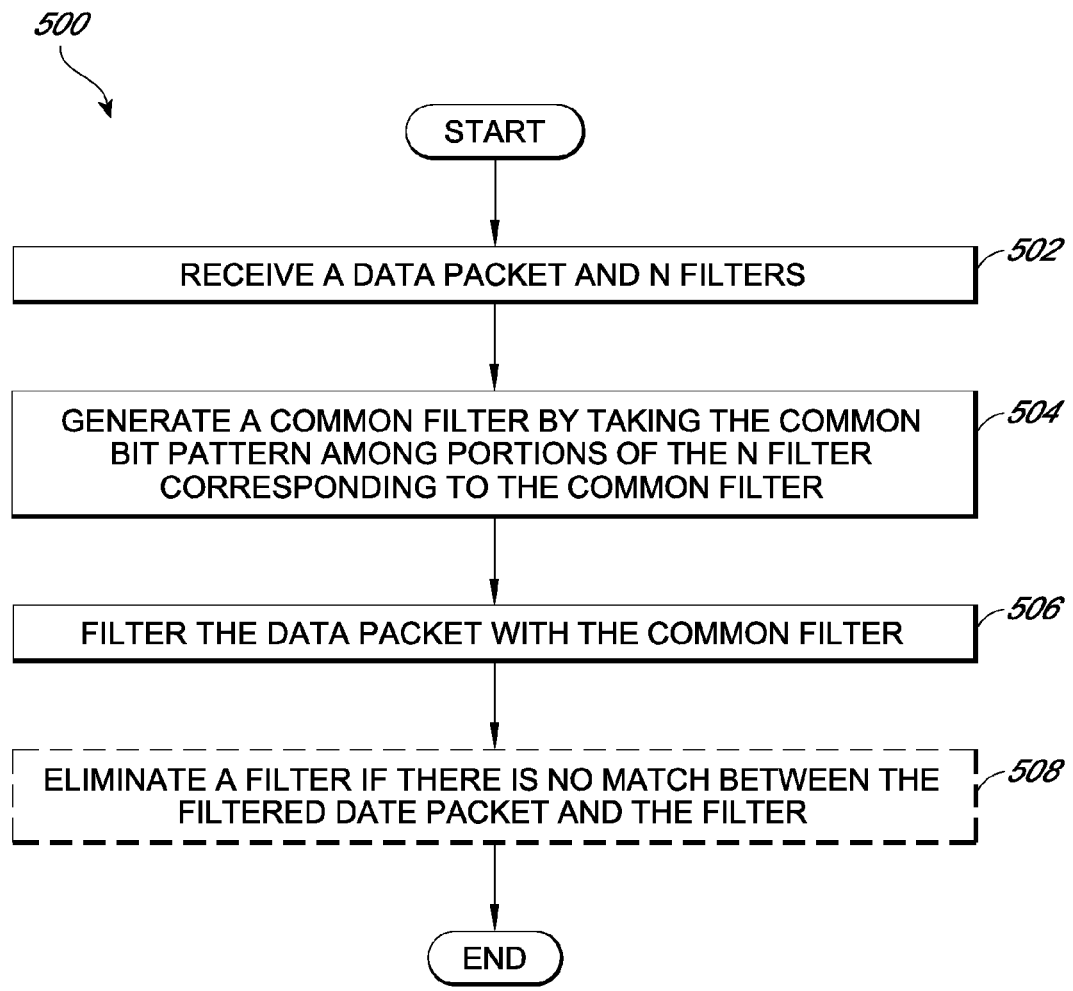
FIG. 3 is a flowchart illustrating one embodiment of an improved scheme for data filtering using multiple filters.

FIG. 3 is a flowchart illustrating one embodiment of an improved scheme for data filtering using multiple filters. Depending on the embodiment, certain steps of the method may be removed, merged together, or rearranged in order. In certain applications, these filters are sufficiently long in length. In some applications, these filters have a relatively weak discriminating power.

The exemplary embodiment generates a common mask among the multiple filters for efficient filtering. The common mask is selected at a location where the majority of the of the filters have the richest bit pattern, i.e., the bit pattern which has the most discriminating power to decide the possibility of a match. The result is used for a pre-filtering to decide the possibility of a match to the original filters. Unmatched filters determined in the pre-filtering are eliminated from full filtering to save computational complexity. In one embodiment, the size of the common mask is selected to be very small in comparison to each filter.

The method 500 starts at block 502, wherein a data packet and N filters are received (N is an integer and N>1) to determine whether any of the N filters matches the data packet. In one embodiment, these filters are sufficiently long. In one embodiment, these filters have a relatively weak discriminating power.

Moving to a block 504, wherein a common filter mask and the corresponding bit values is generated by taking the overlapping mask bits among portions of the N filters corresponding to the common filter, the common filter being of a length smaller than each filter.

This process may further include determining the location and length of the common filter. The common filter may be of any reasonable length. It may be computationally efficient if the length of the common filter is the multiple of a natural computer Word (e.g., 4 bytes). The common filter may start from any location in a packet. Typically, the common filter starts from a byte location. Also, it may be computationally efficient if the common filter starts at a natural Word (e.g., 4-byte) boundary. In one embodiment, the common filter is selected at a location where the majority of the filters have the richest bit pattern.

In one embodiment, the bit pattern complexity is defined as the discriminating power, which may be measured by the number of 1's included in a segment of the filter. Therefore, the larger the number of 1's in a segment, the higher is its discriminating power to decide if the incoming packet is a match to a particular filter. Other criteria or metric for discriminating power may as well be applied.

Subsequently one portion suitable for the pre-filtering engine is selected from the mask of each of the N filters. For each filter, the selected portion is a group of bits in the filter mask corresponding to the common filter, i.e., at the same location as the common filter.

In one embodiment, no portion is selected for a particular filter if the portion in the mask of the filter corresponding to the common filter has a discriminating power lower than a threshold. In one embodiment, no portion is selected for a filter if the portion in the mask of the filter corresponding to the common filter has a number of 1's under a threshold number. Since no portion from this filter is integrated to the common filter, a full length filtering is needed for this filter. The threshold number may be, e.g., 1, 2, 3, or other value depending on the application.

The common filter mask is generated by taking the common bit pattern among the selected portions of the N filters. In one embodiment, the common filter mask is generated by performing a bitwise AND operation between the selected portions of the N filters and using the results to fill in the common filter mask.

A modified value for each of the N filters is generated by filtering the value of the filter with the common filter mask. In one embodiment, the value of each filter is filtered with the common filter mask by performing a bitwise AND operation between the value of the filter and the common filter mask. This is done because the common filter mask only examines a portion of the original mask of the filter. The modified value for a filter, which together with the common filter mask is used for a possible match, thus is made to only contain values for a portion of the original mask of the filter.

Moving to a block 514 and 516, a pre-filtering process with the common filter is used to reduce the amount of processing by eliminating unmatched filters. At block 514, the data packet is filtered with the common filter to determine whether there is a possible match between the data packet and each of the N filters. In the exemplary embodiment, the data packet is first filtered with the mask of the common filter. The filtered data packet is then compared to the modified value of each of the N filters to determine whether the filtered data packet includes the same bits as the modified value of the filter.

Next at block 506, the common filter mask is applied to the data packet to determine whether there is a match between he filtered data packet and each of the N filters. The match is determined by comparing the filtered data packet and the modified value of each of the N filters. Moving to optional block 508, a filter is eliminated from further filtering if there is no match between the filtered data packet and the filter.

These unmatched filters do not need to move forward to full filtering since they are impossible to match. The filters not eliminated are then used to determine whether there is a match between the data packet and each of these filters by a full length filtering. Filters that matched in the pre-filtering stage, i.e., the filters not eliminated, then proceed with full filtering to decide if there is a complete match. Also, filters that are not included to make the common mask are not eliminated and therefore also proceed with full filtering.

In one embodiment, if the length of the common filter is a large number and the filter set is not changed frequently, a suitable hash scheme such as CRC32, or more complicated algorithm SHA-1, may be applied to the modified value of the filters to generate a short digest (e.g., 4 bytes) for efficient comparison. The hash of the result of filtering the data packet with the common filter mask is then computed and compared to the modified value of each filter to determine whether there is a match between the filtered data packed and the modified value of the filter.

FIGS. 4-5 are diagrams illustrating an example in which the method of FIG. 3 is applied for data filtering. Though the example is illustrated in an exemplary context of a set top box, the method is equally applicable to data filtering for other applications.

Figure 4A:
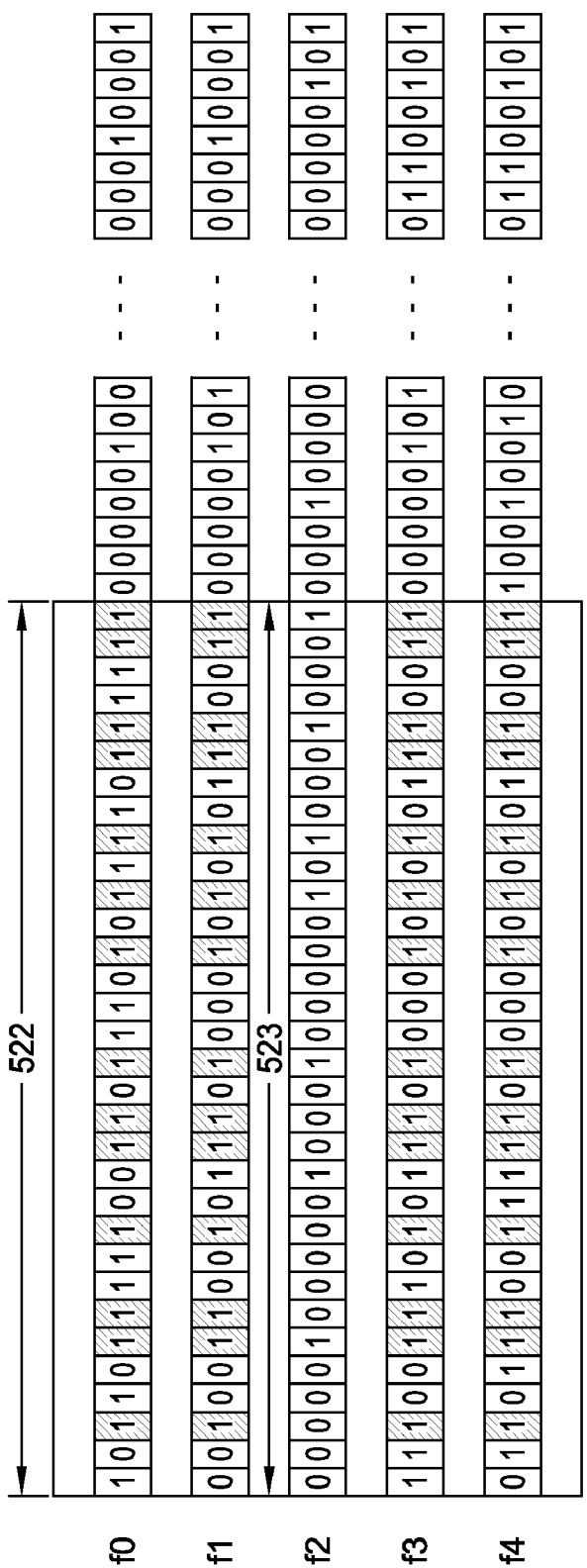
FIG. 4A illustrates the mask of an exemplary filter set to be applied to a data packet in a set top box.

FIG. 4A illustrate the mask of an exemplary filter set to be applied to a data packet in a set top box. The filter set includes 5 filters, each having a mask and a value (not shown in FIG. 4A). The mask f0, f1, f2, f3, and f4 of these filters are illustrated. These five filters may be of the same or different sizes. A data packet is considered a valid data, and is sent for further processing, if the data packet is matched to one of the mask and value.

In the example, a common filter is formed by taking the common bit pattern among selected portions from the filters as follows. The common filter has four bytes and starts from the first bit in the packet. The location of the common filter is shown as 522.

Next a portion suitable for pre-filtering is selected from each filter. For each filter, a portion corresponding to the common filter is identified. It is then determined whether the identified portion of the filter satisfied the threshold for discriminating power. Only those identified portions having a discriminating power higher than the threshold is selected.

In this example, the segment 523 of the filter f2 is not selected because of a low discriminating power. The segments of other filter masks f0, f1, f3, and f4 are selected. The segment 523, which is not selected, does not enter the pre-filter engine. Full filtering is required to decide if the data packet is a match for the filter f2.

Figure 4B:
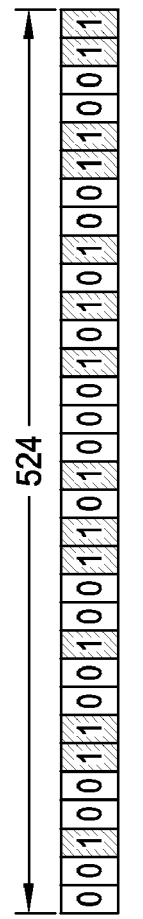
FIG. 4B illustrates the resulted mask for the common filter.

The selected segments of the filters f0, f1, f3, and f4 are then used to generate the common filter mask. FIG. 4B illustrates the resulted mask for the common filter. The common filter mask 524 is generated by filling the common filter mask with the common bit pattern among the selected segments of the filters f0, f1, f3, and f4. In one embodiment, the common bit pattern among the selected segments is generated by performing a bitwise AND operation between the selected segments. For example, the leftmost bit in the common filter mask 524 is 0 because the leftmost bit in the mask of the filter f1 is 0. The third bit from the left in the common filter mask 524 is 1 because each corresponding bit in the filters f0, f1, f3, and f4 is 1.

Figure 5A:
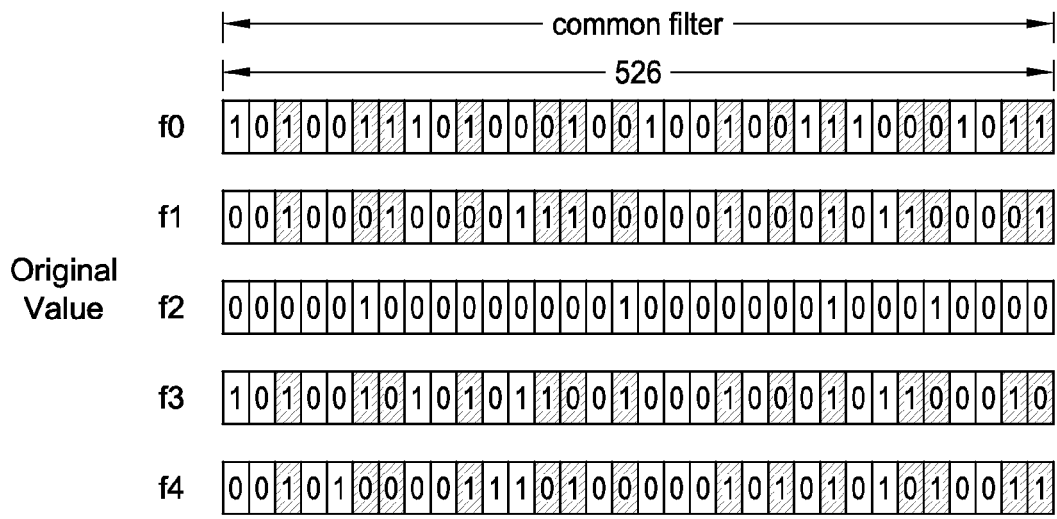
FIGS. 5A and 5B are diagrams illustrating one exemplary process of adjusting the value of each of the N filters.
Figure 5B:

FIGS. 5A and 5B are diagrams illustrating one exemplary process of adjusting the value of each of the N filters. FIG. 5A is a diagram illustrating the original value for a portion of each filter in the filter set corresponding to the common filter mask. As shown, the value for a portion corresponding to the common filter mask is listed for each filter. For example, the segment 526 is the value for a portion corresponding to the common filter mask for the filter f0.

As described in FIG. 4, the value for each filter is adjusted to generate a modified value by filtering the value of the filter with the common filter mask. FIG. 5B is a diagram illustrating the modified value for a portion of each filter in the filter set corresponding to the common filter mask. In this example, the value of each filter is filtered with the common filter mask by performing a bitwise AND operation between the original value and the common filter mask. The segment 528 is a modified value of the filter f0 generated by performing a bitwise AND operation between the segment 526 (shown in FIG. 5A) and the common filter mask 524 (shown in FIG. 4B).

The value for f2 is included in FIG. 5B for reference. However, the value for f2 is not adjusted since no portion is selected from the filter f2 for pre-filtering.

As the common filter shown in FIGS. 4B and 5B is available, a pre-filtering process with the common filter mask 524 and the modified value of the filters f0, f1, f3, and f4 is used to reduce the amount of processing by eliminating un-matched filters. The first 4 bytes of a data packet is first filtered by the common filter mask 524. The result is compared to the modified value of the filters f0, f1, f3, and f4.

If the result does not match the segment 528, which is the modified value of the filter f0, then the packet cannot match the filter f0. The filter f0 is eliminated and is not examined for full length filtering. A similar process is performed for other filters f1, f3, f4. The filter f2 is not eliminated since no portion from the filter f2 is incorporated into the common filter mask.

Next, the data packet is filtered with the remaining filters by full length filtering to determine whether there is a match between the data packet and each filter. For example, if filters f1 and f4 are eliminated from the candidate list in the pre-filtering process, the remaining filter are f0, f2, and f3. A full length filtering is performed with filters f0, f2, and f3 to determine whether any of them matches the data packet.

Figure 6:
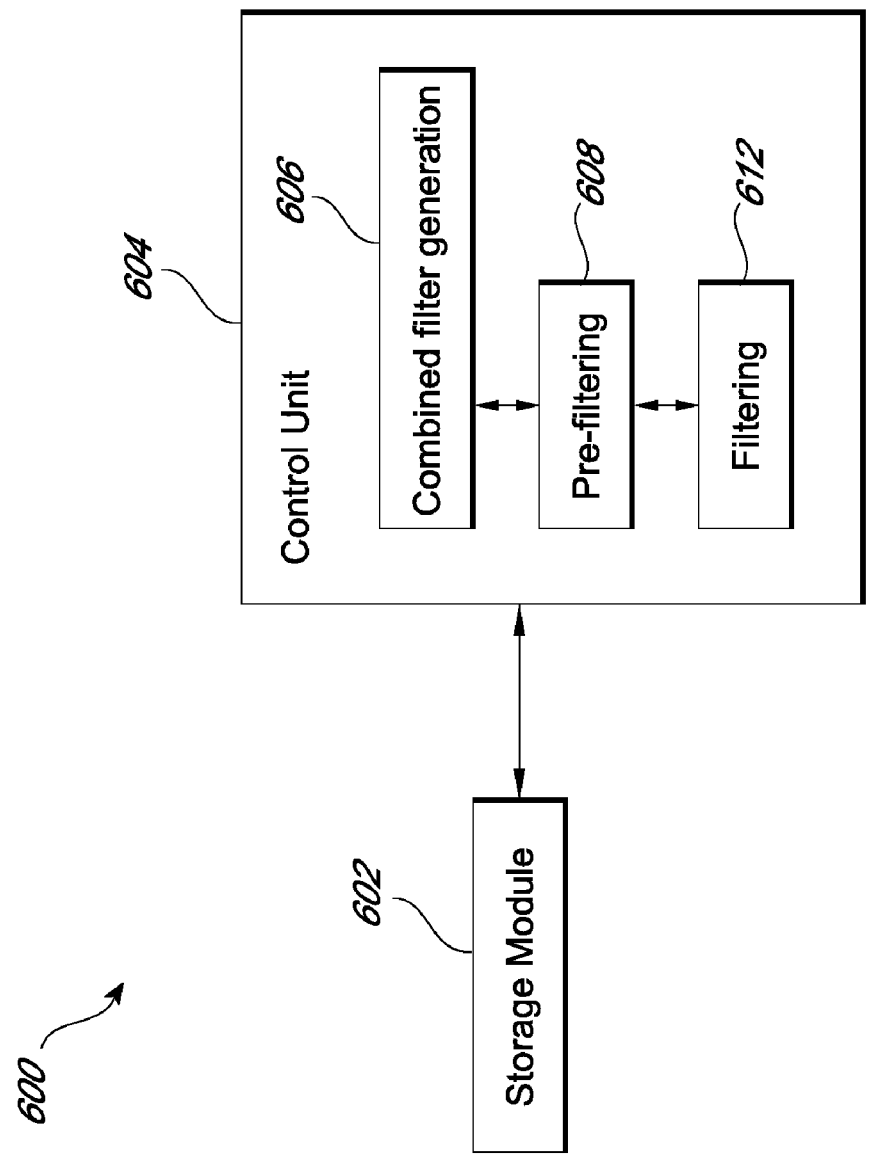
FIG. 6 is a functional block diagram of one embodiment of a system for data filtering using multiple filters.

FIG. 6 is a functional block diagram of one embodiment of a system for data filtering using multiple filters with a common filter mask. The system 600 comprises a storage module 602 for storing various data. The storage module 602 may store, e.g., incoming data packets for processing and the N filters to be used for data filtering. In one embodiment, the storage module 602 may also store a program which, when executed on a processor or a computer, performs a method as described above in FIG. 3. The storage module 602 may be any computer-readable medium or any device suitable for data storage, e.g., a memory capable of storing firmware.

The system 600 comprises a control unit 604 which controls the operation of the system 600. The control unit 604 may be implemented in hardware, firmware, software, or any combination thereof. In one embodiment, the control unit 604 is a processor which may be any suitable general purpose single- or multi-chip microprocessor, or any suitable special purpose microprocessor such as a digital signal processor, microcontroller, or a programmable gate array. As is conventional, the processor may be configured to execute one or more software applications. In certain embodiments, the control unit 604 runs a software application to perform a method for data filtering using multiple filters such as the method described above in FIG. 3.

In the exemplary embodiment, the control unit further comprises a common filter generation module 606, a pre-filtering module 608, and a full length filtering module 612. The common filter generation module 606 generates a common filter mask and the corresponding bit values by taking the overlapping mask bits among portions of the N filters corresponding to the common filter. The common filter has a length smaller than each filter. In one embodiment, the common filter generation module 606 is configured to (a) select a portion in the mask of each of the N filters corresponding to the common filter mask, (b) generate the common filter mask by taking the overlapping mask bits among identified portions of the filters, and (c) generate a modified value for each of the N filters by filtering the value of the filter with the common filter mask, wherein the modified values for the N filters being possible values corresponding to the common filter mask.

The pre-filtering module 608 applies the common filter mask to the data packet to determine whether there is a match between the filtered data packet and each of the N filters. In one embodiment, the pre-filtering module 608 is configured to filter the data packet with the common filter mask and compare the filtered data packet to the modified value for each of the N filters to determine whether the filtered data packet matches the modified value for the filter. The pre-filtering module 608 may further eliminate a filter if there is no match between the filtered data packet and the filter. The full length filtering module 612 performs a full length filtering on the data packet using those filters not eliminated by the pre-filtering module 608, in order to determine whether any filter matches the data packet.

In the foregoing embodiments, a common filter mask is generated by taking the common bit pattern among key common element extracted from the mask of each filter for pre-filtering data packets. Unmatched filters in the pre-filtering are eliminated from full filtering. In one embodiment, the common filter mask is selected to have a small size in comparison to the filters. In applications where pattern of these filters are arbitrary or when the incoming packets hit different filters evenly, a substantial number of filters are eliminated during pre-filtering. Therefore, these embodiments reduce computational complexity of the data filtering substantially. The running time comparison between the traditional sequential data filtering and the filtering with common filter mask will be further discussed below. Certain of the foregoing embodiment work particularly well when the filters have a relatively weak discriminating power.

The foregoing embodiments do not require any prior knowledge of the filters, nor do they depend on fixed mask patterns. This makes them suitable for applications that do not have prior knowledge of the filters and incoming packets, e.g., the set top box.

Exemplary Running Time Comparison

The exemplary running time analysis shows that the embodiments as described above are more efficient than the traditional full length filtering. The running time of an algorithm on a particular input can be expressed as a function $O(a)$, wherein a indicates the number of primitive operations or steps executed. The following notation is used for this analysis:

k: Number of filters
n: Number of bits in a filter (For simplicity, we will assume that every filter contains the same number of bits.)
l: Number of bits in a common filter
d: Discriminating power for common mask method (i. e. number of 1's in a common filter)
w: Number of bits in a word
c: Number of words in a filter ($=n/w$)
c': Number of words in a common filter (equivalent to $d/w$)
s: Number of matched filters after the pre-engine filtering The worst case running time for the traditional method can be measured as $O(n/w \cdot k) = O(c \cdot k)$. Performance of the traditional method may become a quadratic function of k, as c (i.e. $n/w$) approaches the number of filters k, that is, $O(k^2)$ if c is of a value close to k.

In comparison, the embodiments using a common mask has its worse case running time calculated as follows:

$$\text{Worst case running time} = O(c') + O(s \cdot (n-1)/w) \text{ i.e.,}$$

$$O(\text{pre-engine}) +$$

$$O(\text{full filtering after pre-engine filtering})$$

$$= O(c') + O(s \cdot (c - 1/w)), \text{ note: } n/w = c$$

$$= O(c') + O(s \cdot c - s \cdot 1/w)$$

$$= O(c') + O(s \cdot c), \text{ if } c \gg 1/w$$

$$= O(c \cdot s), \text{ if } 1 \gg d$$

In applications where the filters are sufficiently long and the common mask has weak discriminating power, both $c \gg 1/w$ and $1 \gg d$ hold true. As shown above, the common filter mask scheme is more efficient than the traditional method, i.e., O(c·s)<O(c·k) (as s<k).

Various embodiments of a method are described above, including, e.g., a method for data filtering with multiple filters as described in FIG. 3. In one embodiment, a software program may be stored in a computer-readable medium. The software program, when being executed by a computer, performs the method.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of filtering a data packet, comprising:
   receiving a data packet and N filters wherein N is an integer and is greater than or equal to one, each of the N filters comprising a bit mask and corresponding bit values;
   generating a common filter mask by taking the overlapping mask bits among the bit masks of a selected group of N filters and a corresponding bit value of the common filter mask, wherein the length of the common filter mask is shorter than each of the bit mask of the N filters in the selected group and the corresponding bit value of the common filter mask is smaller than each of the corresponding bit value of the N filters;
   applying the bit mask of each of the N filters to the received data packet;
   applying the common filter mask to the filtered data packet to determine whether there is a match between the filtered data packet and each of the N filters; and
   eliminating the respective filter if there is no match between the filtered data packet and the filter.

2. The method of claim 1, further comprising eliminating a respective filter if there is no match between the filtered data packet and the filter.

3. The method of claim 1, wherein the bit mask of each filter comprising the same number of bits as the value of the filter, wherein the mask is used to generate filtered data packet by performing an AND operation between the bit mask of the filter and the data packet, wherein a match is found between a filter and a data packet if each bit of the value matches a corresponding bit of the filtered data packet.

4. The method of claim 1, wherein the common filter mask comprises a number of bytes, each byte comprising 8 bits.

5. The method of claim 1, wherein the common filter mask is located at a natural Word boundary.

6. The method of claim 1, wherein generating a common filter mask further comprises:
   selecting a portion in the mask of each of the N filters corresponding to the common filter mask;
   generating the common filter mask by taking the overlapping mask bits among identified portions of the filters; and
   generating a modified value for each of the N filters by filtering the value of the filter with the common filter mask, wherein the modified values for the N filters being possible values corresponding to the common filter mask; and
   wherein applying the common filter mask to the data packet further comprises:
   filtering the data packet with the common filter mask and comparing the filtered data packet to the modified value for each of the N filters to determine whether the filtered data packet matches the modified value for the filter.

7. The method of claim 6, wherein no portion is selected from the bit mask of a filter if the portion corresponding to the common filter mask has less than a threshold number of 1's and therefore the filter is not eliminated by filtering the data packet with the common filter mask.

8. The method of claim 7, wherein the threshold number is 1 or 2.

9. The method of claim 6, wherein the generating of the common filter mask comprises performing a bitwise AND operation between the value of the filter and the common filter mask.

10. The method of claim 6, wherein the generating of a modified value for each of the N filters comprises performing a bitwise AND operation between the value of the filter and the common filter mask.

11. The method of claim 6, wherein the comparing of the filtered data packet to the modified value for each of the N filters is performed by a hash scheme.

12. A tangible and non-transitory computer-readable medium having stored therein a program which, when executed, performs a method of filtering a data packet, the method comprising:
   receiving a data packet and N filters wherein N is an integer and is greater than or equal to one, each of the N filters comprising a bit mask and corresponding bit values;
   generating a common filter mask by taking the overlapping mask bits among the bit masks of a selected group of N filters and a corresponding bit value of the common filter mask, wherein the length of the common filter mask is shorter than each of the bit mask of the N filters in the selected group and the corresponding bit value of the common filter mask is smaller than each of the corresponding bit value of the N filters;
   applying the bit mask of each of the N filters to the received data packet;
   applying the common filter mask to the filtered data packet to determine whether there is a match between the filtered data packet and each of the N filters; and
   eliminating the respective filter if there is no match between the filtered data packet and the filter.

13. A system for filtering a data packet, comprising:
   a storage module configured to store a data packet and N filters, each of the N filters comprising a bit mask and corresponding bit values;
   a common filter generation module configured to generate a common filter mask and the corresponding bit values by taking the overlapping mask bits among the bit masks of a selected group of N filters and a corresponding bit value of the common filter mask, wherein the length of the common filter mask is shorter than each of the bit mask of the N filters in the selected group and the corresponding bit value of the common filter mask is smaller than each of the corresponding bit value of the N filters; and a pre-filtering module configured to filter the stored data packet with the bit mask of each of the N filters to the stored data packet, to apply the common filter mask to the filtered data packet to determine whether there is a match between the filtered data packet and each of the N filters, and eliminating the respective filter if there is no match between the filtered data packet and the filter.

14. The system of claim 13, wherein the data packet is received from a cable head end.

15. The system of claim 13, wherein the pre-filtering module eliminates a filter if there is no match between the filtered data packet and the filter, wherein the system further comprises a filtering module configured to filter the data packet with each of the N filters not eliminated to determine whether there is a match.

16. The system of claim 13, wherein the pre-filtering module is configured to filter the data packet with the common filter mask and compare the filtered data packet to the modified value for each of the N filters to determine whether the filtered data packet matches the modified value for the filter, and wherein the common filter generation module is configured to:

(a) select a portion in the mask of each of the N filters corresponding to the common filter mask;

(b) generate the common filter mask by taking the overlapping mask bits among identified portions of the filters; and (c) generate a modified value for each of the N filters by filtering the value of the filter with the common filter mask, wherein the modified values for the N filters being possible values corresponding to the common filter mask.

17. A system for filtering a data packet, comprising: means for receiving a data packet and N filters wherein N is an integer and is greater than or equal to one, each of the N filters comprising a bit mask and corresponding bit values;

means for generating a common filter mask by taking the overlapping mask bits among the bit masks of a selected group of N filters and a corresponding bit value of the common filter mask, wherein the length of the common filter mask is shorter than each of the bit mask of the N filters in the selected group and the corresponding bit value of the common filter mask is smaller than each of the corresponding bit value of the N filters;

means for applying the bit mask of each of the N filters to the received data packet;

means for applying the common filter mask to the filtered data packet to determine whether there is a match between the filtered data packet and each of the N filters; and means for eliminating the respective filter if there is no match between the filtered data packet and the filter.

* * * * *